United States Patent
Cole et al.

(10) Patent No.: US 6,839,836 B2
(45) Date of Patent: Jan. 4, 2005

(54) PORTABLE COMPUTING DEVICE WITH SPECIALIZED OPERATING SYSTEM

(75) Inventors: James R Cole, Albany, OR (US); James P Dickie, Corvallis, OR (US); Robert P Bliven, Corvallis, OR (US); Dennis R Esterberg, Philomath, OR (US); Chadwick W Stryker, Albany, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 657 days.

(21) Appl. No.: 09/834,483

(22) Filed: Apr. 13, 2001

(65) Prior Publication Data

US 2002/0152372 A1 Oct. 17, 2002

(51) Int. Cl.⁷ .................................................. G06F 9/24
(52) U.S. Cl. .......................................... 713/2; 713/320
(58) Field of Search .............................. 713/1, 2, 100, 713/300, 320, 322, 323, 324, 330; 711/102, 103, 170; 341/22; 455/556.2; 710/62, 63, 64

(56) References Cited

U.S. PATENT DOCUMENTS

| | | | |
|---|---|---|---|
| 5,768,163 A | 6/1998 | Smith, II | 364/705.01 |
| 6,163,274 A * | 12/2000 | Lindgren | 340/7.29 |
| 6,367,074 B1 * | 4/2002 | Bates et al. | 711/170 |
| 6,542,979 B1 * | 4/2003 | Eckardt | 711/173 |
| 6,598,159 B1 * | 7/2003 | McAlister et al. | 713/2 |
| 6,631,469 B1 * | 10/2003 | Silvester | 713/2 |
| 6,680,677 B1 * | 1/2004 | Tiphane | 341/22 |

* cited by examiner

*Primary Examiner*—Lynne H. Browne
*Assistant Examiner*—Thuan Du

(57) ABSTRACT

Upon activation of a portable computer, a check is made to see if a user has indicated a reduced operating system is to be used. If the user has indicated the reduced operating system is to be used, the reduced operating system is activated. The reduced operating system is stored within a special memory area within the portable computer. The reduced operating system uses less system resources than a full function operating system for the portable computer. If the computer is activated and the user has not indicated the reduced operating system is to be used, the full function operating system of the portable computer is activated.

20 Claims, 3 Drawing Sheets

PORTABLE COMPUTING DEVICE WITH SPECIALIZED OPERATING SYSTEM

The present patent application is related to Ser. No. 09/802,299, (pending) entitled "Computing Device Having A Low Power Secondary Processor Coupled To A Keyboard Controller" and assigned to the same assignee.

BACKGROUND

The present invention pertains to portable computing devices and pertains particularly to a portable computing device with a specialized operating system.

Portable computing systems vary widely in size and functionality. This allows users very wide choice in selecting a portable computing device that satisfies the particular requirements and/or preferences of the user.

For example, many notebook computers provide functionality similar to a desktop computing system. These notebook computers provide a full size keyboard, full size display, a fully functional operating system, and a large selection of input/output ports. In addition, add-on devices that use internal slots and PC card slots provide a great deal of expandability. Hard disk drives, floppy disk drives, compact disk read only memory (CDROM) drives, digital video disk (DVD) drives and so on give a great many storage options for notebook computers.

The advanced features of a notebook computer, however, come with a price. The price is not only monetary, but also can be in inconvenience to the user, such as the increase in size and weight of many notebook computers, the power consumption necessary to support all the functionality and potential functionality of these notebook computers and the boot-up time required to load the operating system at start time.

Some notebook computers have used quick launch keys. The quick launch keys, however, work through the normal operating system of the notebook computer. Thus when using a quick launch key, all components of the operating system need to be completely loaded, the application must be launched, and any connected accessories need to be enabled before functions are ready to be performed by the notebook computer.

An alternative to a notebook computer is a personal digital assistant (PDA). PDAs have the advantage of a reduced size and weight and reduced power consumption. The trade-off, however, is significantly reduced functionality. A PDA typically has reduced storage capability, a smaller display screen and a limited keyboard. The operating system for a PDA is often significantly less versatile than that for a notebook computer.

However, PDAs are often very well adapted for particular purposes. For example, a PDA can provide convenient access to features like a calendar, address book, to-do list, e-mail, expense tracking, memo-pad, dictionary, games, image viewers, maps, and so on. Additionally various attachments can be connected to a PDA to add additional functionality. These include, for example, expanded keyboards, global positioning system (GPS) receivers, modems, scanners, digital cameras, and so on. The simplified operating system of a PDA can be an advantage when it allows a quick (even instantaneous) start-up time for the PDA.

SUMMARY OF THE INVENTION

In accordance with the preferred embodiment of the present invention, upon activation of a portable computer, a check is made to see if a user has indicated a reduced operating system is to be used. If the user has indicated the reduced operating system is to be used, the reduced operating system is activated. The reduced operating system is stored within a special memory area within the portable computer. The reduced operating system uses less system resources than a full function operating system for the portable computer. If the computer is activated and the user has not indicated the reduced operating system is to be used, the full function operating system of the portable computer is activated.

DESCRIPTION OF THE PREFERRED EMBODIMENT

In a preferred embodiment of the present invention, upon activation of a portable computer, a check is made to see if a user has indicated a reduced operating system is to be used. If the user has indicated the reduced operating system is to be used, the reduced operating system is activated. The reduced operating system is stored within a special memory area within the portable computer. The reduced operating system uses less system resources than a full function operating system for the portable computer. If the computer is activated and the user has not indicated the reduced operating system is to be used, the full function operating system of the portable computer is activated.

For example, the user indicates the reduced operating system is to be used by selecting a quick launch key. There can be multiple quick launch keys corresponding to multiple application programs. Some of the application programs which can be accessed using quick launch keys are, for example, e-mail, a web browser, a mapping program, a digital camera program, camera program and calendaring. As will be understood by persons of ordinary skill in the art, this is only a partial list as virtually any program supported by a personal digital assistant (PDA)—and some that are not supported by PDAs—can be implemented in the special memory and run using the reduced operating system. To facilitate this, in some embodiments of the present invention, the reduced operating system is compatible with an operating system implemented to run on a personal digital assistant (PDA). Resources on the portable computer that are necessary to perform an application program selected by the user are activated by the portable computer when running the reduced operating system.

For example, the special memory area is a memory module implemented using flash memory, or by any form of memory that is capable of permanently storing data. In one preferred embodiment of the present invention, the full function operating system is loaded into random access memory from a hard disk drive.

The present invention allows users to access PDA-like information (contacts, simple email, web browsing, appointments, etc) with a portable computer, but without the time and battery life costs of booting the full operating system on the portable computer. The present invention allows leveraging of available ports of a portable computer to reduce total cost and "clutter", improves responsiveness of a portable computer beyond anything feasible using a fully functional operating system, and adds significant value to a base portable computer. The present invention also allows for improved battery life of the portable computer.

Figure 1:
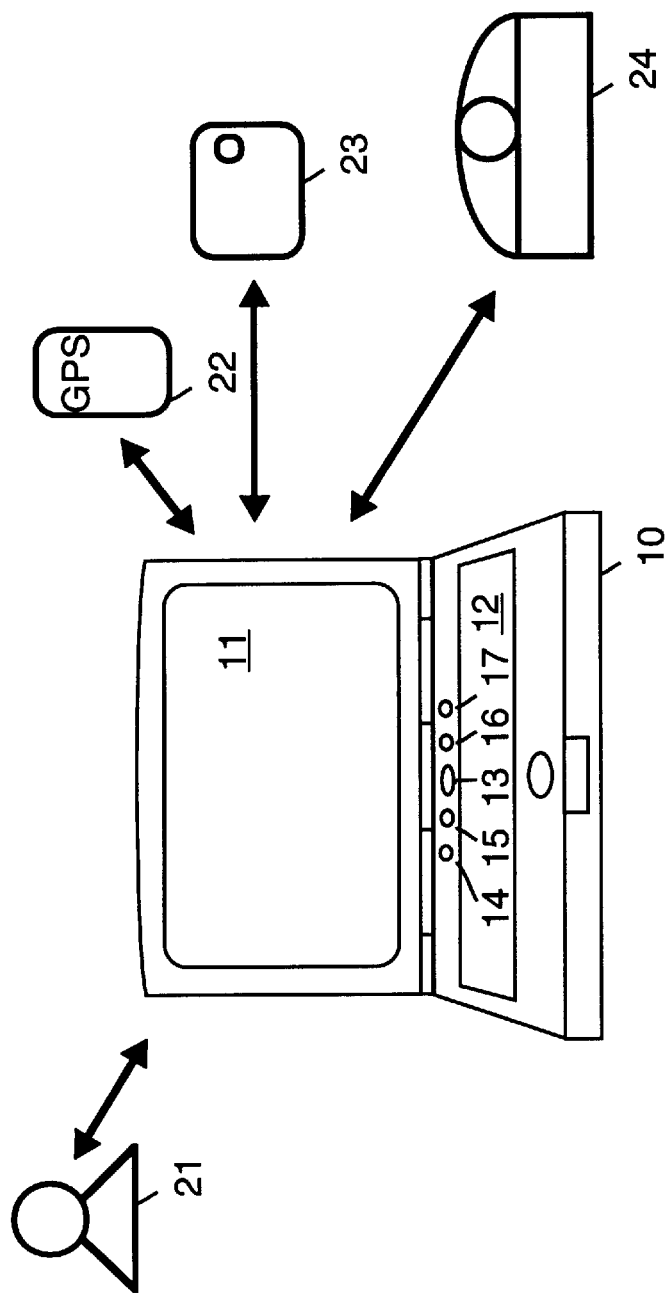
FIG. 1 is a simplified diagram that shows a portable computer with several quick launch keys in accordance with a preferred embodiment of the present invention.

FIG. 1 shows a portable computer 10 with a display 11 and a keyboard 12. A start-up key 13 is selected by a user that desires to start-up portable computer 10 in a normal (full function) operating mode. Quick launch keys can be used to instantly startup portable computer 10 in special modes. For example, FIG. 1 shows portable computer 10 to include a quick launch key 14, a quick launch key 15, a quick launch key 16 and a quick launch key 17.

Selection by the user of one of quick launch keys 14 through 17 results in the powering on of a limited number of resources of portable computer 10. For example, pressing quick launch key 14 results in activating the processor, display 11 and certain input/output (I/O) features of portable computer 10. Selecting other quick launch keys result in other functionality of portable computer 10 being activated. For example, display 11 need not be activated for features launched by every quick launch key.

In the preferred embodiment, each of quick launch keys 14 through 17 is associated with a particular application program stored within portable computer 10. In alternative embodiments, other interfaces may be used to access the quick launch of particular application programs. For example, a combination of keys may be used to access a single quick launch application. Alternatively, certain I/O activity on a port of portable computer 10 can result in the quick launch of various application programs or functionality running under a reduced operating system.

The use of the above-described quick launch facility is very useful when a user desires to use portable computer 10 as an appliance for a particular function. Through the quick launch keys, the user can evoke a predefined application program running on firmware or a hard disk drive partition. This memory is devoted to the appliance mode of the portable computer.

FIG. 1 illustrates some of the attachments that can be used when portable computer 10 is in a particular appliance mode. For example, portable computer 10 interfaces with a GPS receiver 22 when in a mapping and/or navigating mode. When working with a digital camera, a user quick launches on portable computer 10 a focus and image capture utility. Portable computer 10 receives pictures and stores pictures from digital camera 23.

Portable computer 10 can also transfer images to a projector 24 in a special mode or receive digital video from a video camera 21 in a special mode.

To bring up a special mode, the user can use one of the quick launch keys to instantly start portable computer 10 as an "appliance" without using the normal operating system of portable computer 10. Portable computer 10 thus has capabilities with the speed and simplicity of use of a devoted function product. This allows users to quickly invoke a use mode for quick capture of information or for quick access to information, without the need for boot-up procedure of the operating system.

In addition to supporting appliances, other functionality can be accessed within portable computer 10 without loading the normal operating system. For example, web browsing and e-mail are accessible by a user without loading the normal operating system. By using e-mail outside of the normal operating system, a virtual firewall can be established allowing virus software to detect and kill viruses before the viruses are within the operating system and file structures. Also, opportune, momentary use of email is enhanced by quick launch access to an e-mail application program.

The essential functions of information capture appliances can be more concisely housed as accessories if portable computer 10 takes on the viewing function. Cameras can be focusing devices. A GPS receiver can be utilized as a receiving accessory, and so on.

Figure 2:
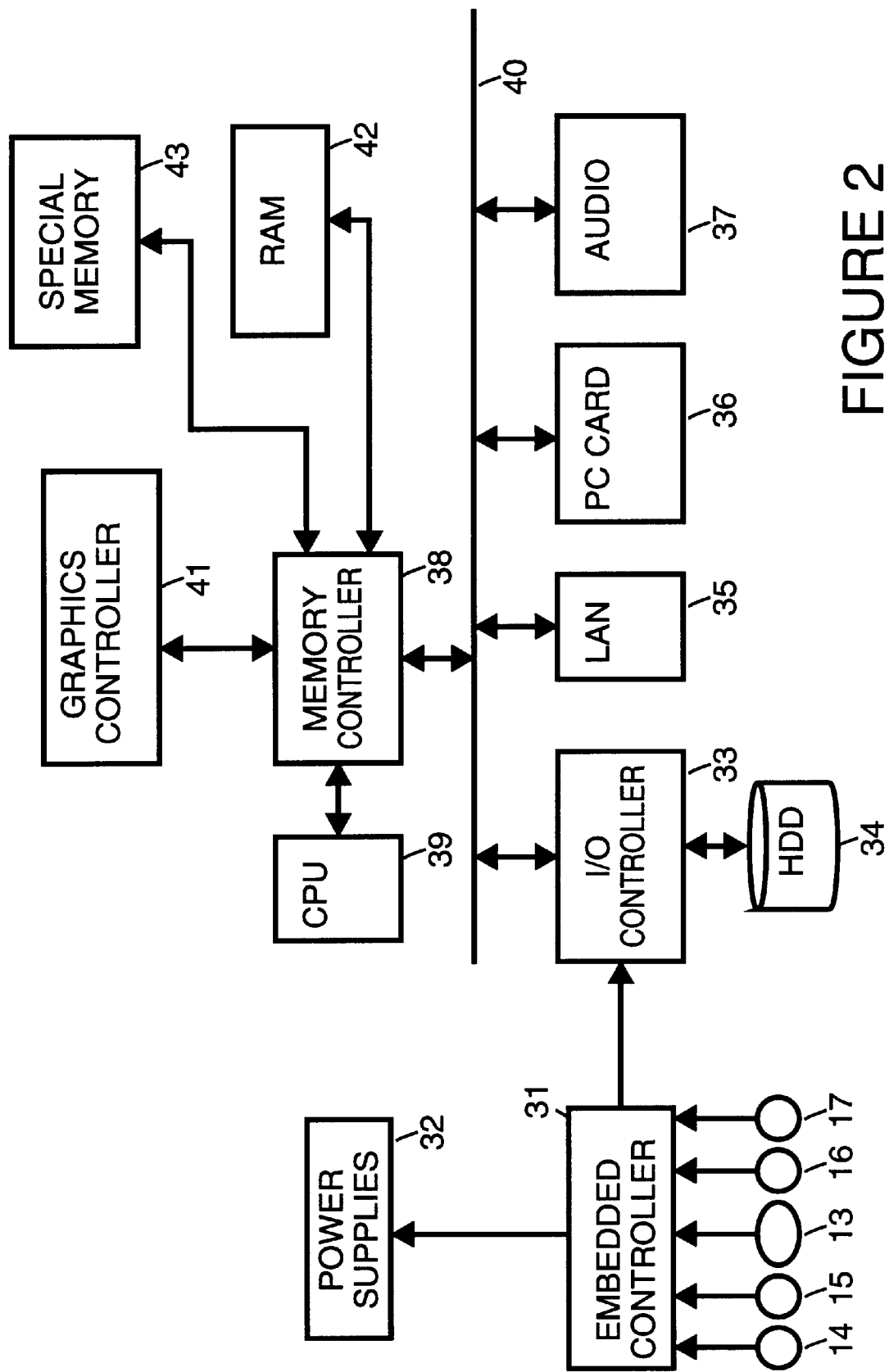
FIG. 2 is a simplified functional block diagram of the portable computer shown in FIG. 1 in accordance with a preferred embodiment of the present invention.

FIG. 2 is a simplified functional block diagram of portable computer 10. An embedded controller 31 receives input from start-up key 13 and quick launch keys 14 through 17. Based on the inputs, embedded controller 31 selects which of power supplies 32 to activate. Connected to an input/output (I/O) bus 40 is an I/O controller 33, a local area network (LAN) interface 35, a PC card interface 36, an audio interface 37 and a memory controller 38. Other entities may be connected to I/O bus 40 as well.

I/O controller 33 is connected to a hard disk drive (HDD) 34 and embedded controller 31. Memory controller 38 is connected to a central processing unit (CPU) 39, a graphics controller 41, random access memory (RAM) 42 and special memory 43. RAM 42 is, for example composed of dynamic RAM (DRAM). Special memory 43 contains, for example, flash memory or some other kind of permanent storage. RAM 42 and special memory 43 may be implemented using separate memory module slots. Alternatively, special memory 43 can be implemented using memory available in a PC card installed in one of the standard slots available in portable computer 10.

For increased versatility, special memory 43 is removable memory that is available for CPU 39 to execute out of directly. For example, for available software that executes on a PDA, 16 MB of flash memory is sufficient to store the operating system (OS), application programs, and data to support basic functionality and several quick launch applications. To implement this functionality within portable computer 10 requires a similar amount of memory. The size of special memory 43 varies based on the sophistication of the operating system and the amount of resources required by the quick launch applications.

When portable computer 10 is started up using start-up key 13, the normal (full function) operating system (e.g., Windows 2000, available from Microsoft Corporation), stored in hard disk driver 34, is loaded into RAM 42 for execution. When portable computer 10 is started up using any of quick launch keys 14, 15, 16 or 17, portable computer 10 is started up using a simplified operating system, such as the Windows CE operating system, available from Microsoft Corporation). Windows CE has the ability to execute on standard platforms using microprocessors available from Intel Corporation and compatibles. Windows CE can make use of standard graphics, PCMCIA, and so on. The Windows CE operating system optionally includes a simple web-browsing client, and a simple e-mail client. Both of these are simpler versions of their full-capability counterparts, Internet Explorer and Outlook, also available form Microsoft Corporation. Alternatively, other operating systems could be run, provided they did not require more memory space than is available within special memory 43.

For certain quick launch applications, data can also be stored in special memory 43 allowing a start-up without powering up RAM 42. This allows special memory 43 to be implemented as a memory based module that contains all the required software and data storage to implement quick launch applications. In this case, at quick launch startup, memory controller 38 is configured to access only special memory 43. RAM 42 is disabled to save power. When booting under the normal operating system, memory controller 38 is configured, for example, to see only RAM 42. Special memory 43 is disabled, except for the case where it is desirable to access data stored in special memory 43 during operation of a quick launch application.

One of the desired benefits from running quick launch applications using an operating system in special memory 43 is improved battery life. Unneeded resources within portable computer 10 are disabled. Depending on the quick launch application, unneeded resources include hard disk drive 34, display 11, DVD drives (not shown but connectable to memory bus 40), perhaps some graphics related resources and so on. Additionally, aggressive throttling of CPU 39 (e.g., by lowering clock speed) can be performed to effectively slow operation of CPU 39, resulting in reduced power requirements for portable computer 10 when running a quick launch application.

Figure 3:
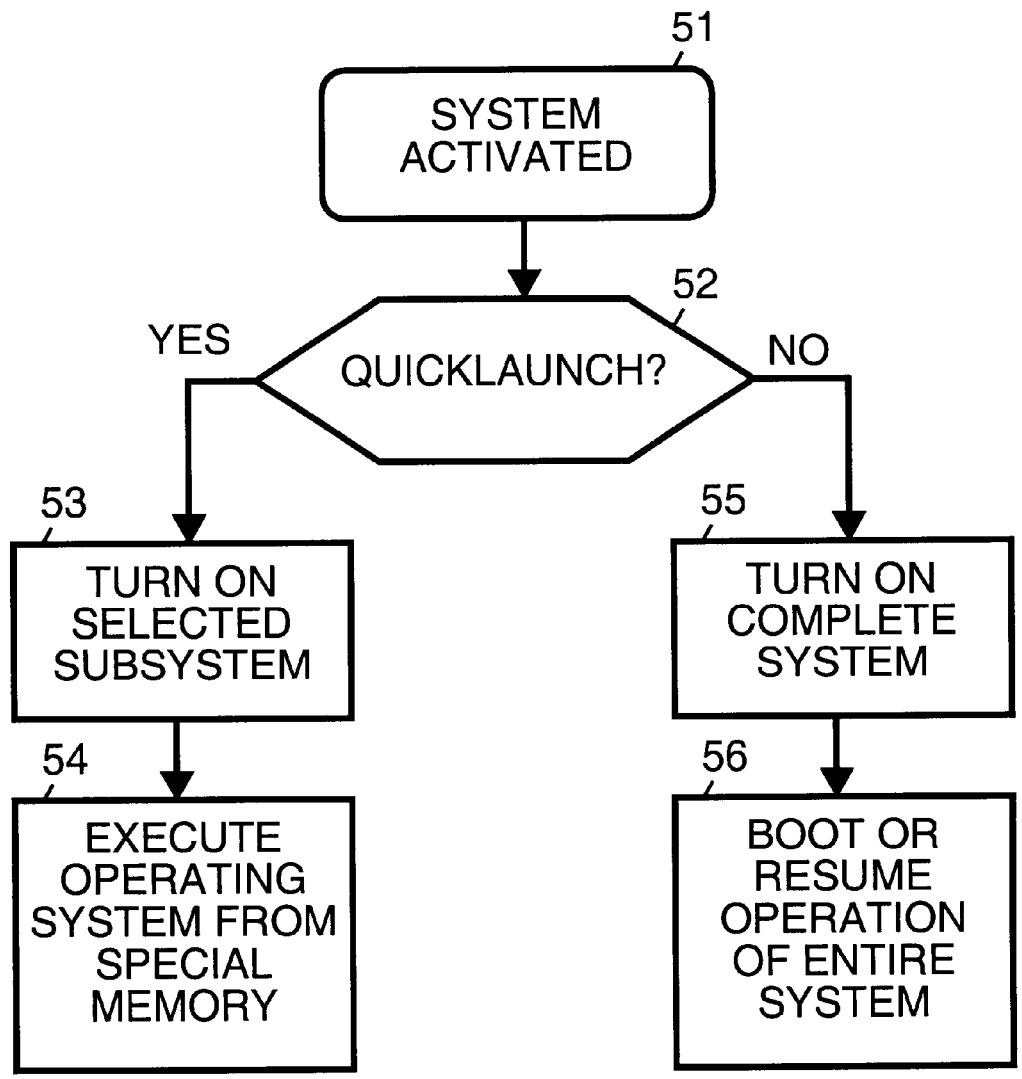
FIG. 3 is a simplified flowchart that illustrates activity of a portable computer at start-up in accordance with a preferred embodiment of the present invention.

FIG. 3 is a simplified flowchart that illustrates operation of portable computer 10 at activation. In a step 51, portable computer 10 is activated. In a step 52, embedded controller 31 determines whether activation resulted from a selection of one of quick launch keys 14 through 17. If not, in a step 55, embedded controller 31 turns on all power supplies 32. In a step 56, embedded controller 31 triggers booting or awakening of the entire (full function) operating system stored in hard disk drive 34.

If, in step 52, embedded controller determines that activation resulted from a selection of one of quick launch keys 14 through 17, in a step 53, embedded controller 31 turns on the subsystems of portable computer 10 necessary to support the selected quick launch application program. In a step 54, embedded controller 31 triggers activation of the operating system stored in special memory 43. In the preferred embodiment, once the operating system stored in special memory 43 is activated, more than one of the quick launch applications can be simultaneously active. The number of programs that can run simultaneously is only limited by the resources available in the reduced operating mode.

A software setup allows the user to determine how the notebook will respond when a quick launch key is pressed during the normal operating mode. In one mode, if portable computer 10 is running under the normal operating system and one of quick launch keys 14 through 17 is selected, a suspend-to-disk operation is performed and portable computer 10 is restarted under the operating system stored in special memory 43. In another mode, if portable computer 10 is running under the normal operating system and one of quick launch keys 14 through 17 is selected, an operating system shut-down is performed and portable computer 10 is restarted under the operating system stored in special memory 43. In yet another mode, if portable computer 10 is running under the normal operating system and one of quick launch keys 14 through 17 is selected, the operating system will check to see if a full featured (e.g., PC) version of the application is available. If available, the operating system will start the full featured version of the application.

When data from a quick launch application program is stored in special memory 43, it may be necessary to reconcile the data with corresponding data stored in hard disk drive 34. For example, a contacts database stored in special memory 43 built and maintained by a quick launch contact program may need to be reconciled with a similar data base built by a contacts program running under the normal operating system of portable computer 10. For many popular operating systems, the necessary reconciliation (synchronization) software already exists. For example, when the normal operating system for portable computer 10 is Microsoft Windows, and the operating system within special memory 43 in Microsoft Windows CE, an off-the shelf reconciliation program running under the normal operating system of portable computer 10 can perform the reconciliation the use with the addition of a special driver. The special driver accesses special memory 43, parses the file structure, and presents the data to the reconciliation software. The special driver presents data from special memory 43 to the reconciliation program as if the data were being made available over a serial network or a USB network. In a preferred embodiment of the invention, the reconciliation program and the special driver are run every time the normal operating system is booted. This assures that the two databases are always in agreement and eliminates any requirements of user intervention. Alternatively, or in addition, the user is given the opportunity to run the reconciliation program from the normal operating system at any time.

In alternative embodiments of the present invention, reconciliation can be performed when running the operating system within special memory 43, however this entails accessing hard disk drive 34 and parsing the file structure stored therein. However, accessing hard disk drive 34 from the operating system within special memory 43 reduces the long battery life benefits of this mode of operation. Also, for quick launch application the require large amounts of storage space (e.g., a web browser performing a download) storage in hard disk driver 34 can be accomplished by brief powering up hard disk drive 34 while performing a store or access function.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

We claim:

1. A method for operating a portable computer, the method comprising the following:
   (a) upon activating the portable computer, checking to see if a user has selected any one of a plurality of quick launch keys, each of the plurality of quick launch keys being associated with a separate application program;
   (b) if in (a) the user has selected one of the plurality of quick launch keys, performing the following:
      (b.1) activating a reduced operating system stored within a special memory area within the portable computer, the reduced operating system using less system resources than a full function operating system for the portable computer, and,
      (b.2) activating an application program associated with the selected one of the plurality of quick launch keys; and,
   (c) if in (a) the user has not selected any of the plurality of quick launch keys, performing the following:
      (c.1) activating the full function operating system within the portable computer.

2. A method as in claim 1 wherein in (b.1) the special memory area is a memory module implemented using flash memory.

3. A method as in claim 1 wherein in (b.1) the activated application is at least one of the following:
   e-mail;
   web browser;
   mapping program;
   camera program;
   calendaring;
   contacts;
   to do list;
   notes;
   video.

4. A method as in claim 1 wherein (b.1) includes running a central processing unit for the portable computer at a slower clock speed when the reduced operating system is activated than when the full function operating system is activated.

5. A method as in claim 1 wherein in (c.1) the full function operating system is loaded into random access memory from a hard disk drive.

6. A method for operating a portable computer, the method comprising the following:
   (a) upon activating the portable computer, checking to see if a user has selected a quick launch key, the quick launch key being associated with an application program;
   (b) if in (a) the user has selected the quick launch key, performing the following:
      (b.1) activating a reduced operating system and launching the application program associated with the quick launch key, the reduced operating system using less system resources than a full function operating system for the portable computer; and,
   (c) if in (a) the user has not indicated the reduced operating system is to be used, performing the following:
      (c.1) activating the full function operating system within the portable computer,
      (c.2) when the quick launch key is selected and the full function operating system is activated, launching a version of the application program that is able to operate in conjunction with the full function operating system.

7. A portable computer comprising:
   first storage device that stores a full function operating system, the full function operating system being used during full function operation of the portable computer;
   second storage device that stores a reduced operating system, operating of the reduced operating system requiring less resources of the portable computer than operation of the full function operating system;
   a plurality of quick launch keys, each quick launch key being used to launch a corresponding application program to run under the reduced operating system;
   controlling device that, upon activation of the portable computer, determines whether one of the plurality of quick launch keys has been selected, and if so, activates the reduced operating system.

8. A portable computer as in claim 7 additionally comprising a key selectable by a user to indicate the reduced operating system is to be used, the key not being one of the quick launch keys.

9. A portable computer as in claim 7 wherein the second storage device is implemented using flash memory.

10. A portable computer as in claim 7 wherein the first storage device is a hard disk drive.

11. A portable computer as in claim 7 wherein when operating under the reduced operating system, the portable computer activates resources sufficient to perform the corresponding application program selected by the user when activating the portable computer.

12. A portable computer as in claim 11 wherein the corresponding application program selected by the user is at least one of the following:
   e-mail;
   web browser;
   mapping program;
   camera program;
   calendaring;
   contacts;
   to do list;
   notes;
   video.

13. A portable computer as in claim 7, wherein the controlling device is an embedded controller that controls power supplies for resources of the portable computer.

14. A portable computer as in claim 7 additionally comprising:
   a central processing unit, the central processing unit being run at a slower clock speed when the reduced operating system is activated than when the full function operating system is activated.

15. A portable computer as in claim 7, wherein when a first quick launch key is selected upon activation of the portable computer, the reduced operating system is activated and a first application associated with the first quick launch key is launched, and wherein when the when the first quick launch key is selected and the full function operating system is already activated, the portable computer, launches a version of the first application that is able to operate in conjunction with the full function operating system.

16. A portable computer comprising:
   first storage device that stores a full function operating system, the full function operating system being used during full function operation of the portable computer;
   second storage device that stores software for performing a first application program, the first application program being one of a plurality of application programs not requiring the full function operating system to be active in order to operate; and,
   a plurality of quick launch keys, each quick launch key being associated with one of the plurality of application programs, wherein upon a user selecting any quick launch key from the plurality of quick launch keys, a first application program, from the plurality of application programs, associated with the selected quick launch key, is activated without activating the full function operating system.

17. A portable computer as in claim 16 wherein the second storage device is implemented using flash memory.

18. A portable computer as in claim 16 wherein when the first application program is activated, the portable computer activates resources that are sufficient to perform the first application program.

19. A portable computer as in claim 18 wherein the first application program is one of the following:
   e-mail;
   web browser;
   mapping program;
   camera program;
   calendaring;
   contacts;
   to do list;
   notes;
   video.

20. A portable computer as in claim 16 additionally comprising:
   a central processing unit, the central processing unit being run at a slower clock speed when the first application program is activated than when the full function operating system is activated.

* * * * *

UNITED STATES PATENT AND TRADEMARK OFFICE
CERTIFICATE OF CORRECTION

PATENT NO. : 6,839,836 B2  
APPLICATION NO. : 09/834483  
DATED : January 4, 2005  
INVENTOR(S) : James R. Cole et al.

Page 1 of 1

It is certified that error appears in the above-identified patent and that said Letters Patent is hereby corrected as shown below:

IN THE CLAIMS

Claim 15, Column 8, line 18, delete second occurence of "when the"

Signed and Sealed this

Eighth Day of April, 2008

JON W. DUDAS  
*Director of the United States Patent and Trademark Office*